UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

LUBRICANT.

No. 830,739.

Specification of Letters Patent.

Patented Sept. 11, 1906.

Application filed June 10, 1905. Serial No. 264,547.

*To all whom it may concern:*

Be it known that I, HENRY NOEL POTTER, a citizen of the United States, and a resident of New Rochelle, county of Westchester, State of New York, have invented certain new and useful Improvements in Lubricants, of which the following is a specification.

In an application for Letters Patent of the United States, filed December 30, 1904, Serial No. 238,925, I have disclosed a method of producing silicon monoxid. The description therein given constitutes the first disclosure of silicon monoxid as a product and of any method of producing the same.

In the process described in the aforesaid application the monoxid of silicon appears mainly in the form of a very fine powder, although it also appears to a limited extent in vitreous form. The qualities of the silicon-monoxid powder are remarkable in many ways, the same being of extreme fineness and by virtue of that quality and others being adapted to many novel and useful applications. I have found, for example, that powdered silicon monoxid may be combined with lubricating-oils or with greases to form lubricants having qualities of great value. The addition of silicon-monoxid powder to a thin oil or grease thickens it and makes it applicable for service where heretofore naturally thick oils or greases alone could be used. It is particularly useful in the making of mixed lubricants composed of oils and fats or greases, where the fluidity of the resulting material must be controlled, as will be at once apparent.

Silicon-monoxid powder as a constituent of lubricants has a distinct advantage over graphite in that it "takes" oil instead of shedding it. It is not unusual for graphite to leave the oil and form a hard cake. The monoxid powder has no tendency to do this.

I have found that the amount of oil used to lubricate a bearing is reduced by thickening with monoxid powder. The wearing-surfaces given by this lubricant have a mirror-like polish and show as low a friction as when oil alone is used. I have observed that after a bearing has been operated with a lubricant containing silicon monoxid its surfaces can have all lubricant removed with gasolene or otherwise and can then be operated for long intervals of time without lubrication of any kind whatever and without exhibiting an extreme rise of temperature and cutting action, which would be observed if the monoxid treatment had been omitted. The reason of this surprising action is not apparent, but may be analogous to the action of bearings made of glass, which have sometimes been used without lubrication, the nature of silicon monoxid in its finely-divided state being such as to perhaps embed itself in the substance of the bearing metal and give a wearing-surface analogous to glass.

I claim as my invention—

1. A lubricant comprising a lubricating-oil mixed with powdered monoxid of silicon.

2. A lubricant containing silicon-monoxid powder as an ingredient.

3. A thick lubricant composed of a thinner lubricant plus silicon-monoxid powder.

4. A lubricating-paste composed of grease thickened with silicon monoxid.

5. A lubricant-paste containing oil and thickened with silicon monoxid.

Signed at New York, in the county of New York and State of New York, this 7th day of June, A. D. 1905.

HENRY NOEL POTTER.

Witnesses:
WM. H. CAPEL,
GEORGE H. STOCKBRIDGE.